Nov. 6, 1951   G. O. TURNBULL   2,573,937
VARIABLE SPEED PULLEY AND V-BELT TRANSMISSION
Filed Dec. 29, 1949   2 SHEETS—SHEET 1

INVENTOR.
Glen O. Turnbull
BY Paul O. Pippel
Atty

Nov. 6, 1951          G. O. TURNBULL          2,573,937
VARIABLE SPEED PULLEY AND V-BELT TRANSMISSION
Filed Dec. 29, 1949          2 SHEETS—SHEET 2
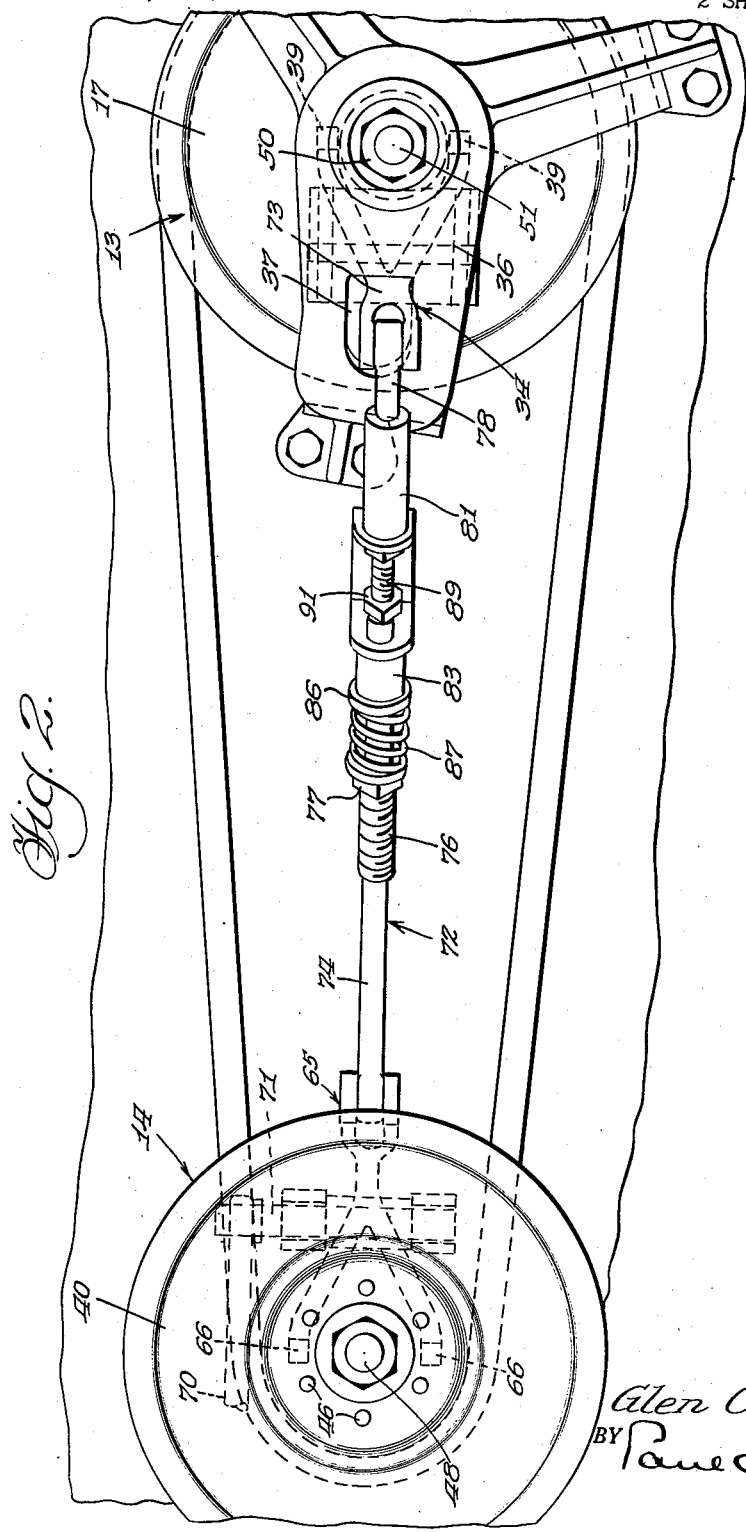
INVENTOR.
Glen O. Turnbull
BY Paul O. Pippel
Atty.

Patented Nov. 6, 1951

2,573,937

UNITED STATES PATENT OFFICE 2,573,937

VARIABLE-SPEED PULLEY AND V-BELT TRANSMISSION

Glen O. Turnbull, Rock Island, Ill., assignor to International Harvester Company, a corporation of New Jersey Application December 29, 1949, Serial No. 135,557

2 Claims. (Cl. 74—230.17)

This invention relates to a new and improved variable speed pulley and V-belt transmission.

Cooperating V-belt pulleys in recent years have been made adjustable in order to effect variations in driving relationship between two pulleys. In other words, one pulley may be made to have a narrow spacing whereas the cooperating pulley may be adjusted so it has a wide or separated spacing to cause the belt operating therebetween to ride higher and lower within the pulleys and thereby change the transmitted speed from a driving to a driven shaft. Various types of adjustable mechanisms have been employed in order to accomplish the variable speed transmissions. The adjustment of one pulley required an equal adjustment of the cooperative pulley in order to maintain a fixed spacing between the pulley sections for a constant length V-belt. Further, in certain forms of adjustable pulleys there has been provided yieldable means particularly on one of the two pulleys so that an adjustment of one would automatically be compensated for by the yielding of the spring of the other. However, such a construction tended to minimize the effectiveness of the transmission and an excessive load being carried thereby would cause the belt to slip with resultant unstable power transmission and excessive uneven belt wear.

A principal object of this invention is to therefore provide tie means interconnecting the adjustable V-pulleys in such a manner that one pulley is always moved an equal amount to the adjustment of the other of the cooperative pulleys.

An important object of this invention is the provision of means in a variable speed V-belt transmission to provide means responsive to the adjustment of one pulley to effect adjustment of the other pulley in an equal amount.

Another important object of this invention is to supply means in a variable speed V-belt transmission including a tie mechanism through which a pair of adjustable V-pulleys is simultaneously spaced an equal distance and providing in the tie mechanism a pre-loaded resiliency and a limited yielding means to automatically compensate for slight variations due to belt wear.

Another and still further important object of this invention is to provide adjusting mechanism for a pair of cooperative V-pulleys including a yieldable member and adjustable means for regulating the limits within which the yieldable member may operate.

A still further important object of this invention is to provide control mechanism for manually simultaneously shifting cooperative V-belt pulleys through an equal distance.

Other and further important objects of this invention will become apparent from the disclosures in the following specification and accompanying drawings.

In the drawings:

Figure 2 is a side elevational view of the device as shown in Figure 1.

As shown in the drawings:

Figure 1:
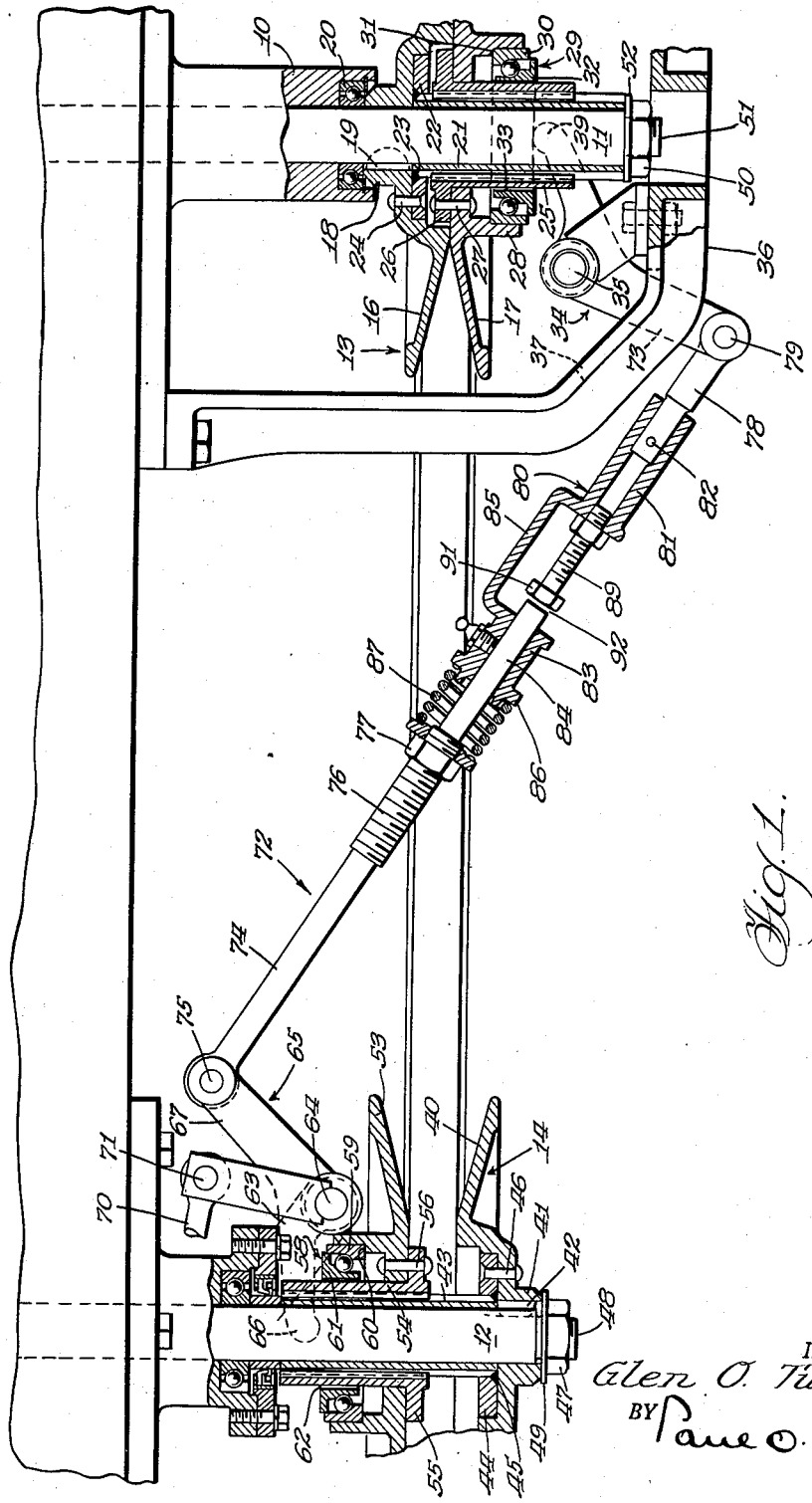
Figure 1 is a top plan view of the variable speed V-belt transmission of this invention.

The reference numeral 10 indicates generally a supporting structure having a driving shaft 11 journaled in one portion thereof and a driven shaft 12 lying parallel to and spaced from the driven shaft 11 and similarly journaled within the supporting structure 10. A V-belt pulley 13 is mounted over the driving shaft 11 and similarly a V-belt pulley 14 is mounted over the driven shaft 12. By means of a V-belt 15 drive is transmitted from the shaft 11 to the shaft 12, both of which are journally mounted in the supporting structure 10.

The V-belt pulley 13 is provided with opposed half sections 16 and 17. The pulley half 16 is provided with a hub portion 18 adapted to surround the shaft 11. A key 19 joins the hub 18 to the shaft 11 for concurrent rotation of these parts. A ball bearing 20 is disposed between the supporting structure 10 and the end of the pulley half hub 18 as well as encircling the shaft 11. The bearing 20 thus is conducive to the rotation of the shaft and hub with respect to the stationary supporting structure 10.

A sleeve 21 is mounted on the shaft 11 and extends from a position adjacent the hub 18 to substantially the end of the shaft. A ring or washer-like member 22 surrounds the sleeve 21 adjacent its inner end and is welded thereto as shown at 23. The ring is fastened by means of rivets 24 to the pulley half 16. It is thus apparent that as the shaft 11 is rotated the pulley half 16 is similarly being rotated along with its integral parts, the sleeve 21 and the ring 22.

The outer surface of the sleeve 21 is externally splined to slidably receive an internally splined sleeve 25 which constitutes a hub for the pulley half 17. The sleeve 25 has an outwardly extending annular flange 26 which is fastened to the pulley half 17 by means of rivets or the like 27. The pulley half 17 is formed with an axially extending annular lip 28 concentric with the shaft 11 for the purpose of receiving a ball bearing 29. The outer race 30 is press-fitted within the sleeve-like lip 28 and abuts a shoulder 31 formed in the lip. The inner bearing race 32 surrounds the sleeve 25 but is spaced therefrom as shown by the clearance 33. The pulley half 17 along with the sleeve hub 25 and the ball bearing 29 is permitted axial movement along the splined sleeve 21 which superposes the shaft 11 and thus the spacing between the pulley halves 16 and 17 may be changed as desired. Slidable movement of the pulley half 17 is accomplished by a shifting fork 34. The shifter fork 34 is pivoted at 35 on a bracket 36 forming a part of the supporting structure 10. As shown in Fig. 2 the bracket 36 is generally yoke-shaped and has an opening 37 through which an operating arm 38 of the shifter form 34 extends. The fork 34 is provided with fingers 39 in the form of a U and arranged and constructed to engage the inner race 32 of the ball bearing 29 for axial movement of the bearing and the pulley half 17 along the shaft 11.

(Similarly the pulley 14 includes a pulley half 40 which has a sleeve-like hub 41 fastened by means of a key 42 to the shaft 12 to be driven. An elongated sleeve 43 is mounted on the shaft 12 in a manner similar to the sleeve 21. An annular ring member 44 is welded to the sleeve 43 at 45 and forms an outwardly extending flange for the sleeve 43. The ring member 44 is fastened to the pulley half 40 by means of rivets 46. Thus, as the pulley half 40 is rotated the structure including the sleeve 43, ring 44, and the shaft 12 will similarly rotate.

(A nut 47 threadedly engages the end 48 of the shaft 12 and through the medium of a washer 49 maintains the pulley structure on the confines of the shaft 12. The V-pulley 13 and its associated structure is also maintained on the shaft 11 against endwise movement by means of a nut 50 upon threadedly engaging the end 51 of the shaft 11. The nut 50 maintains a washer 52 against the sleeve 21 thus holding the sleeve against axial movement off the end of the shaft 11.

(The pulley 14 also includes a pulley half 53 adapted for sliding movement toward and away from the pulley half 40. The sleeve 43 is externally splined to slidably receive an internally splined sleeve 54. The sleeve 54 has an outwardly extending annular flange 55 which is fastened by means of rivets 56 to the pulley half 53. Thus the pulley half 53 with its integral sleeve hub 54 may be moved along the splined sleeve 43 with respect to the pulley half 40 and yet regardless of the position of the pulley half 53 the interengaging splines between the members 43 and 54 cause concurrent rotational drive of both pulley halves 40 and 53. This, of course, is similar to the construction in the pulley 13 wherein the pulley half 17 is movable toward and away from the pulley half 16, maintaining concurrent drive of both pulley halves.

(The movable pulley half 53 is equipped with an integral annular lip or sleeve portion 57 spaced from and concentric to the shaft 12 for receiving a ball bearing 58. The outer race 59 of the bearing 58 is press-fitted within the sleeve 57 and its inner end abuts a shoulder 60. The inner race 61 of the bearing 58 surrounds the sleeve hub 54 but is slightly spaced therefrom as shown by the annular clearance 62.) A bracket 63 forming a part of the supporting structure 10 journally carries a shaft 64 upon which a bell crank type of shifter fork 65 is mounted. The shaft 64 constitutes a hinge for the shifter form 65. Fork fingers 66 in a generally U-shaped spacing are adapted to engage the outer side of the inner race 61 of the ball bearing 58 for the purpose of moving the pulley half 53 axially along the shaft 12 through the medium of the inter-engaging splines on the sleeve members 43 and 54. The shifter form 65 is provided with an arm 67 for the purpose of effecting arcuate swinging movement of the fork fingers 66.

The shaft 64 has fastened thereto a pair of upwardly extending spaced arm members 68 and 69. These arms carry a link member 70 at their upper end by means of a pin 71. The link 70 is for the purpose of causing a shifting of the fork members 34 and 65 and may be extended to some remote position.

A tie link mechanism 72 is provided between the shifter fork 34 and the shifter fork 65 and more specifically the arm members 73 and 67. It should be understood that as one pulley has its spacing narrowed the cooperating pulley has its effective belt spacing widened. The pulley halves 17 and 53 will be moved an equal distance as the operating link 70 is shifted. Inasmuch as the movable pulley half of each of the pulleys 13 and 14 is located on the opposite side, the pulley halves 17 and 53 are moved in the same direction but act to oppositely open and close their respective pulleys. Therefore, a constant length V-belt 15 may be used without change throughout the entire adjustment of the pulley drive.

The link mechanism 72 includes a first rod member 74 which is pivotally attached to the fork arm 67 at 75. An intermediate portion of the rod 74 is threaded as shown at 76 for receiving a nut 77. The link mechanism 72 further includes a second rod member 78 which is pivotally attached to the fork arm 73 at 79. A superstructure 80 having a sleeve portion 81 is fixedly carried on the rod 78 by means of a cross pin 82. This super-structure 80 includes a sleeve 83 axially aligned with the sleeve 81 and spaced therefrom. The sleeve 83 is arranged and constructed to slidably engage the end portion 84 of the first rod member 74. The sleeves 81 and 83 are joined by means of the laterally disposed supporting member 85. Thus the superstructure 80 includes the spaced apart sleeves 81 and 83 along with the entire member 85. The end of the sleeve 83 is equipped with an annular flange 86 for maintaining a coil spring 87 against a washer 88 which abuts the nut 77 a spaced distance from the flange 86. With this construction it will be seen that without other limiting means the first and second rod members 74 and 78 of the link mechanism 72 will be capable of telescoping the distance required to completely compress the coil spring 87.

In the present device it is not desired to have full unlimited telescoping of the rod members 74 and 78 and thus a bolt member 89 threadedly engages internal threads 90 in the sleeve portion 81 of the super-structure 80. The bolt head 91 may thus be positioned with more or less spacing as shown at 92 with respect to the end of the rod 74. A lower nut 93 is carried on the bolt 89 and is employed for the purpose of holding the bolt 89 in any desired adjusted position. The length of the space 92 determines the amount of yieldable telescoping between the first and second rods 74 and 78. If the bolt 89 were to be withdrawn from the threaded socket 90 so that the head 91 abutted the end of the rod 74 there would be no yieldability in the link mechanism 59. Similarly, when the bolt 89 is screwed into the threaded socket 90 a greater space is created at 92 thus permitting the coil spring 87 to be compressed an amount equal to the length of the space 92.

The spring 87 is previously pre-loaded or in other words put under an initial compression so that there is always a constant tendency for the spring to separate the first and second rod members 74 and 78 to thus normally urge both of the slidable pulley halves 17 and 53 toward their co-operative fixed pulley halves 16 and 40. This places a limited spring load on the V-belt 15. It should be understood that slight wear and variations in the V-belt will thus be compensated by this initial spring loading of the coil spring 87.

In operation, a user of the device of this invention may effect change in speed transmission from the driving to the driven shaft by pulling or pushing on the control link 70. This directly changes the separation of the pulley halves 17 and 53 an equal amount with respect to their respective cooperative fixed pulley halves 16 and 40 so that the constant length V-belt 15 functions in all adjusted positions of the transmission pulleys 13 and 14. During imparting of the drive from the drive shaft 11 to the driven shaft 12 slight variations caused by belt wear or the like are compensated for by the preloading of the spring 87 which is positioned intermediate the first and second rod members 74 and 78 respectively. The spring 87 is arranged so that it will urge the pulley halves of both pulleys together and it is similarly arranged and constructed so that when the pulley halves tend to separate, such separation occurs only against the action of the spring 87 until such time as the space 92 is entirely eliminated causing the link mechanism 72 to become rigid throughout its length. It will thus be seen that the pulley transmission system of this invention is relatively stable and yet has adjustable limiting yieldable characteristics which are vitally necessary to effective and continued operation of such a device.

Numerous details of construction may be varied throughout a wide range without departing from the principles disclosed herein, and I therefore do not propose limiting the patent granted hereon otherwise than as necessitated by the appended claims.

What is claimed is:

1. A variable speed pulley and V-belt transmission comprising a supporting structure, a driving shaft journaled on said supporting structure, a driven shaft parallel to and journaled on said supporting structure, a first adjustable V-pulley mounted on said driving shaft, a second adjustable V-pulley mounted on said driven shaft and in alignment with said first adjustable V-pulley, said first adjustable V-pulley having a half thereof fixed to said drive shaft and the other half thereof slidable on said drive shaft toward and away from said fixed half, said second adjustable V-pulley having a half thereof fixed to said driven shaft in alignment with the slidable half of the first adjustable V-pulley and the other half thereof slidable on said driven shaft in alignment with the fixed half of the first adjustable V-pulley, a first fork means pivotally mounted on said supporting structure adjacent the slidable half of the first adjustable V-pulley, a second fork means pivotally mounted on said supporting structure adjacent the slidable half of the second adjustable V-pulley, a V-belt joining said first and second adjustable V-pulleys, tie rod means having limited yielding means incorporated therein joining the first and second fork means, whereby a shifting of said tie rod means causes an equal shifting of said slidable pulley halves, said tie rod means including a first rod member, a second rod member spaced from and in axial alignment with the first rod member, a collar on the first of said rods, a superstructure fastened to the second of said rods and having a sleeve portion slidably journaled on the first of said rods, spring means interposed between said collar and said sleeve, and an adjustable screw means provided on the end of the second of said rods whereby the space between the ends of the first and second rods may be adjusted.

2. A device as set forth in claim 1 in which means is provided for manually shifting said tie rod means.

GLEN O. TURNBULL.

REFERENCES CITED

The following references are of record in the file of this patent:

UNITED STATES PATENTS

| Number | Name | Date |
| --- | --- | --- |
| 350,053 | Guttinger | Sept. 28, 1886 |
| 2,336,022 | Everett | Dec. 7, 1943 |

FOREIGN PATENTS

| Number | Country | Date |
| --- | --- | --- |
| 136,293 | Germany | Nov. 24, 1902 |
| 11,307 | Great Britain | 1904 |